3,674,430
PROCESS FOR THE PYROGENIC MAKING OF
HIGHLY DISPERSED SILICON DIOXIDE
Alfred Illigen, Lochau, Austria, and Walter Neugebauer,
 Konstanz, Germany, assignors to Deutsche Gold- Und
 Silber-Scheideanstalt vormals Roessler, Frankfurt am
 Main, Germany
Filed June 30, 1970, Ser. No. 51,180
Claims priority, application Germany, July 1, 1969,
P 19 33 291.3
Int. Cl. C01b *33/18, 33/12, 33/00*
U.S. Cl. 23—182 V
13 Claims

ABSTRACT OF THE DISCLOSURE

Silicon dioxide or a material containing the same are reacted with a reducing agent at an elevated temperature. The hot gas containing the silicon monoxide thus formed is then treated with steam whereby a finely dispersed silane groups- and silanol groups-containing solid intermediate product is formed in the gas stream which is then subjected to chilling whereupon the major portion of the solid product is separated from the residual gas and is finally subjected to a thermal aftertreatment at about 100–1000° C.

BACKGROUND OF THE INVENTION

The present invention relates to a process and apparatus for making highly dispersed silicon dioxide by treating silicon dioxide or a material containing the same with a reducing agent at high temperatures so as to obtain a product having strong thickening and thixotropy-producing properties.

Highly dispersed silicic acid is used in many areas of modern technology and consumer goods, for instance as reinforcing filler in rubbers and elastomers, as carrier and component of catalysts, as drying agent, etc. A particular use is in the area of thickening agents for oils and lacquers in which case the addition of small amounts of finely divided $SiO_2$ produces a highly desirable increase of the viscosity and thixotropy.

A small number of the synthetically produced, finely divided silicic acids has a distinct capability to cause thickening and thixotropy in polar and non-polar dispersing agents. The silicic acids that are precipitated by acid from alkali silicate solutions hardly possess these properties. Rather, they are significant in silicic acids produced in a hydrogen-air flame by high-temperature hydrolysis from silicon tetrachloride according to the following equation

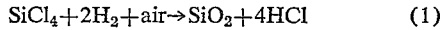
$$SiCl_4 + 2H_2 + air \rightarrow SiO_2 + 4HCl \qquad (1)$$

This process, however, requires a comparatively expensive raw material, that is, silicon tetrachloride which must be produced by reaction from chlorine and silicon. The silicon is obtained by electrothermal methods from quartz and coke, as shown in the following equation

$$SiO_2 + 2C \rightarrow Si + 2CO \qquad (2)$$

The handling of the silicon tetrachloride is difficult because of its corrosive character and requires special protective action. In the hydrolysis of the $SiCl_4$ there is produced an undesirable by-product in the form of the likewise highly corrosive hydrogen chloride. The silicic acid in addition has acid characteristics and therefore must be de-acidified in a special operation. An aqueous suspension thereof nevertheless still has a pH of about 4.

Another conventional process converts quartz, by reaction with hydrofluoric acid, to silicon tetrafluoride, and the latter is then decomposed by high-temperature hydrolysis into finely divided silicon dioxide and hydrofluoric acid which latter is recirculated into the operation. The corrosion problems occurring in this type of process are even more serious than with the $SiCl_4$ process. The toxicity of the hydrofluoric acid requires special protective action. The silicon dioxide thus produced still contains fluoride and likewise has an acid reaction.

During the last few years a process has become known for making finely divided silicon dioxide by an electrothermal operation which permits to produce the finely divided silicon dioxide directly from quartz and coke without requiring expensive and corrosive additional reagents. A gaseous mixture is produced in this process from silicon monoxide and carbon monoxide by means of an electric current and using high temperatures. The product can be re-oxidized immediately above the electric furnace. The thus-produced silicon dioxide is finely dispersed and has a specific surface between about 80 an 350 m.$^2$/g.

This direct process is superior to the $SiCl_4$ process both in regard to the necessary raw materials and to the energy requirements. While the electrothermal reduction of one mole of silicon requires 0.254 kwh. and 2 moles carbon, the production of 1 mole $SiO_2$ by means of gaseous silicon monoxide requires only 0.231 kwh. and 1 mole carbon. Chlorine and hydrogen are no longer necessary in the latter process. Furthermore, the $SiCl_4$ process is carried out in three steps (making of the silicon, making of the silicon tetrachloride, hydrolysis of the silicon tetrachloride) while the direct process requires only a single step.

The silicon dioxide made by the direct process has the same characteristics as the product from $SiCl_4$ in regard to particle size, particle shape, particle size distribution, specific surface, bulk density, light refraction and other properties. However, it has no thickening or thixotropy-producing properties of sufficient interest for practical use. These properties, which probably are due to certain surface-chemical properties and which depend on a particularly high particle attraction in a dispersing medium, are unfortunately of greatest importance in a large technological area, for instance for the increase of viscosity in lacquers and other coating agents, for the making of inorganic greases from oils of thin viscosity, for ointments and pastes, etc. By increasing the thixotropy, for instance, of a lacquer, the lacquer permits easy coating but, after withdrawal of the brush, will not have any tendency to flow down on an inclined wall.

On the other hand, it is desirable to incorporate as little silicon dioxide as possible in the final product. This means that the $SiO_2$ must have strong thickening and thioxotropic properties.

It is therefore an object of the present invention to provide for a process and apparatus for making highly dispersed silicon dioxide by reaction of the silicon dioxide, or a material containing the same, with a reducing agent at a high temperature, provided such process leads to a silicon dioxide having a strong thickening and thixotropic action.

SUMMARY OF THE INVENTION

This object is met by reacting the silicon dioxide or the material containing the same at an elevated temperature with a reducing agent, then treating the hot silicon monoxide-containing gas thus formed with steam so as to form a finely dispersed silane groups- and silanol groups-containing solid intermediate in said gas stream, followed by chilling of the gas stream and separating the major portion of the solid product from the residual gas and finally subjecting the separated solid product to a thermal aftertreatment at about 100–1000° C.

The highly dispersed white silicon dioxide made by applicants' process has strong thickening and thixotropy-causing properties, the said silicon dioxide consisting of spherical, compact primary particles having a diameter between about 5 and 150 millimicrons, a specific surface between 50 and 300 m.²/g., a bulk weight between 15 and 30 g./l. and a viscosity as measured by a Rheometer being at least 200 cp., and the said silicon dioxide exhibiting a neutral reaction when dispersed in water at a 5% concentration.

The invention also embraces an apparatus suited for carrying out the indicated process. This apparatus comprises an electric furnace wherein an arc is established for generating the silicon monoxide-containing gas stream, an outlet arranged above the area of the arc, a tubular duct connecting with said outlet and forming a mixing chamber, an inlet leading into the mixing chamber for passing steam into the chamber so as to react the silicon monoxide with the water vapor, a cooling chamber disposed on top of the arc area of the electric furnace and forming part thereof, the said cooling chamber being associated with or forming the bottom end of said tubular duct and a separator and thermal reactor connected with said mixing chamber and tubular duct.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

The raw materials for the process of the invention preferably are quartz or an $SiO_2$-containing material such as a mineral or synthetic silicate. The conversion to the gas phase, as indicated before, is effected by heating with a reducing agent which latter may be coke, silicon, magnesium, aluminum, silicon carbide, etc.

By heating the mixture of quartz or $SiO_2$-containing material with the reducing agent to temperatures above 1500° C., for instance by means of an electric arc, a complete conversion to the gas phase is effected upon formation of lower gaseous oxides of silicon and, depending on the materials used, of carbon.

This gas is then subjected at such high temperature (in excess of 1500° C.) to the action of water. The latter may be mixed with the gas containing the lower silicon oxides in the form of steam, for instance by blowing the steam into the gas stream by means of a ring of nozzles arranged circumferentially around the gas stream. It is also possible to inject liquid water into the gas by means of a series of nozzles in which case the high temperature will result in the steam formation.

The reaction of the silicon monoxide-containing gas with the steam results in a highly dispersed, silane- and silanol groups-containing intermediate product which is then converted into the silicon dioxide of the desired strong thickening and thixotropic action by means of a subsequent thermal treatment at temperatures between about 100 and 1000° C., preferably between 200 and 700° C., and an average residence time between 0.5 and 10 minutes.

The thermal treatment can be effected in an atmosphere of steam or in air. The residence time of the $SiO_2$ in this case is many times as long (for instance between 100 and 10,000 times as long) as the time of reaction between the silicon monoxide-containing gas and the steam.

The thermal aftertreatment results in an increase of the thickening and thixotropic action and in a decomposition of the intermediately formed silane groups of the silicon dioxide. The decomposition of the silane groups is necessary since these groups result in undesirable reactions because of their high reactivity when the product is used as thickening and thixotropic agent.

It is a particular feature of the process of the invention that the highly dispersed silicon dioxide produced is completely free of halides. This is of special interest when the product is used as a thickening agent in toothpastes and ointments which are packed in metallic containers such as tubes or metal boxes. Corrosion caused by the presence of halides is thus impossible. Such corrosion can have highly detrimental effects, in particular in case of long storage times.

Surprisingly, the pH of the products of the invention (measured in a 4% aqueous suspension) is between 5 and 7 while, as already mentioned, the pH of the silicic acid produced by hydrolysis of silicon tetrachloride, even after a de-acidification step, is not higher than about 4.3.

Figure 1:
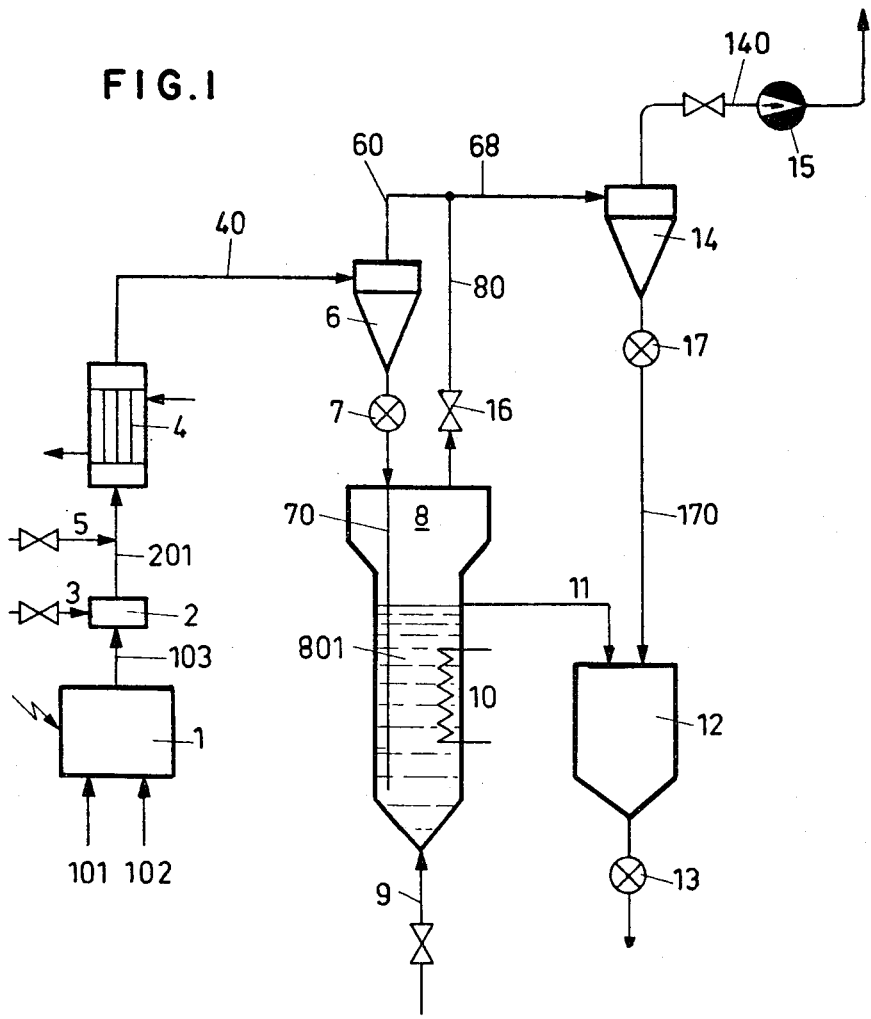
FIG. 1 shows in diagrammatic form the general outlay of the process of the invention.

With reference to the drawings, and in particular FIG. 1, the following is an illustration of the general course of the operation.

The $SiO_2$-containing raw material which is to be reduced, for instance $SiO_2$-sand 101, is fed together with the coke 102 into the electric furnace 1 and is converted to the gas phase at temperatures in excess of 1500° C. The gas containing silicon monoxide and carbon monoxide indicated at 103 leaves the furnace and passes into a mixing chamber 2 which may for instance be provided with a series of nozzles arranged in a circle and directed towards the center. The gas is reacted in the chamber with steam which enters through a duct 3. Thus, a finely dispersed silane and silanol groups-containing $SiO_2$ intermediate product, designated 201 in the drawing, is produced. This product then passes with the flowing gas to a heat exchanger 4 where it is subjected to cooling. Air, steam or another type of gas may be introduced in duct 5.

Following the heat exchanger 4, the gas current is passed to a separator 6 through duct 40. The major portion of the solid intermediate product is separated there and is passed through a valve 7 and duct 70 into a reaction vessel 8. The reaction vessel in the specific example is in the form of a fluidizing-bed reactor. However, other types of reactors may be used which permit a thermal aftertreatment of the intermediate product, such as, revolving tubular reactors or pneumatically operating heated devices.

A small flow of air, steam or another gas is then introduced through the reaction vessel via duct 9 in order to impart a slight fluidizing action to the contents 801 in the reaction vessel 8. In order to maintain the desired treatment temperature of, for instance, between 400 and 700° C., heat is furnished to reaction vessel for instance by electric heater elements 10. The material, after the treatment, then passes through duct 11 into a vessel 12. The material at this time has the desired strongly thickening and thixotropic action. From the vessel 12 it can be removed through a valve 13.

The main gas stream, from which the solids have been separated to a large extent in the separator 6, then passes through duct 60 to separator 14. The gas is united there with the secondary gas stream which is discharged from the reaction vessel 8 through duct 80 controlled by valve 16. The two gas streams are united in the common duct 68. From the separator 14 the gases are withdrawn through duct 140 by means of a suction fan 15. The valve 16 permits to adjust the flow conditions in the separator 6 and reactor 8 for the gas stream. The residual solids separated out in the separator 14 are passed through valves 17 and duct 170 to the receptacle 12.

It is also possible to dispense with the heat exchanger 4 if the temperature of the gas stream can be adjusted to a value which is not deleterious to the apparatus or the solid product entrained in the gas. This can be effected, for instance, by introducing air or steam through duct 5.

The hydrogen and carbon monoxide obtained in the process of the invention, particularly if steam is employed, can be recovered and turned to further use. A separation can for instance be effected by condensing the steam. For reasons of economy it is advisable to effect the condensation at temperatures above 100° C. under pressure in order not to withdraw the condensation heat of the steam from the operation.

Figure 2:
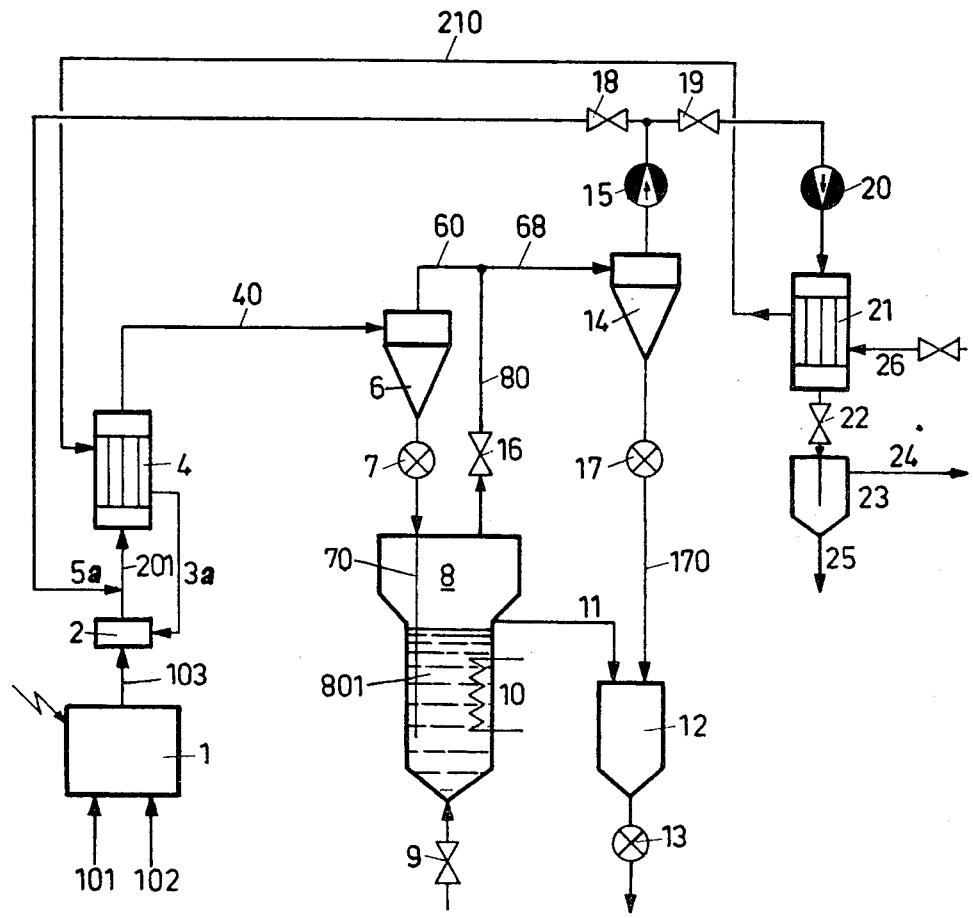
FIG. 2 shows a different embodiment wherein most of the process is the same and the same reference numerals have therefore been used, but which includes an arrangement for regenerating and recovering the steam employed in the process.

A process employing such additional means for regenerating and recovering steam is shown in FIG. 2. For parts identical with those shown in FIG. 1, the same reference numerals are employed. As before, the silicon monoxide-containing gas 103, which leaves the high-temperature furnace 1, is mixed in mixing chamber 2 with steam entering through duct 3a and the principal reaction is thus caused to take place. Additional steam may be added through duct 5a for cooling purposes and for maintaining the gas in motion. The gas, which now contains the intermediate product 201 characterized by the attached silane and silanol groups, is then passed via the heat exchanger 4 to the separator 6 from which the highly dispersed intermediate product flows through valve 7 into the aftertreatment reactor 8 and from there through duct 11 into the collecting vessel 12. Steam is fed into the aftertreatment reactor 8 through duct 9 and maintained at a temperature between 100 and 700° C. by means of the heater 10.

The hydrogen, carbon monoxide, and small fractions of carbon dioxide-containinng steam which leaves the separator 6 and reactor 8 through the valve 16 passes into the separator 14 where residual solids are removed and passed through valve 17 into collecting vessel 12. The gas leaving the separator 14 is drawn off through the suction fan 15 and passes through valve 18 into duct 5a which recirculates the gas into the operation.

So far the described process was more or less the same as that shown in FIG. 1. In the process illustrated in FIG. 2 there is however made an arrangement to pass part of the gas drawn off by suction fan 15 to a compressor 20 controlled by a valve 19. In the compressor gas is compressed to a higher pressure of, e.g., 5 atm. above atmospheric, is condensed in a condensor 21, and then cooled followed by passing the two-phase mixture of water, hydrogen, carbon monoxide and carbon dioxide through valve 22 into separator vessel 23. The mixture of $H_2$, CO and $CO_2$ is removed through duct 24, while the condensed water is withdrawn through duct 25.

Through duct 26 an amount of water is introduced into condenser 21 corresponding to the condensate withdrawn through duct 25 and amount of water used up in the chemical reaction. This water, in the form of steam, is passed through duct 210, heat exchanger 4 and duct 3a back into the mixing chamber 2. The silicon dioxide of high thickening and thixotropic properties is removed through the valve 13.

Figure 3:
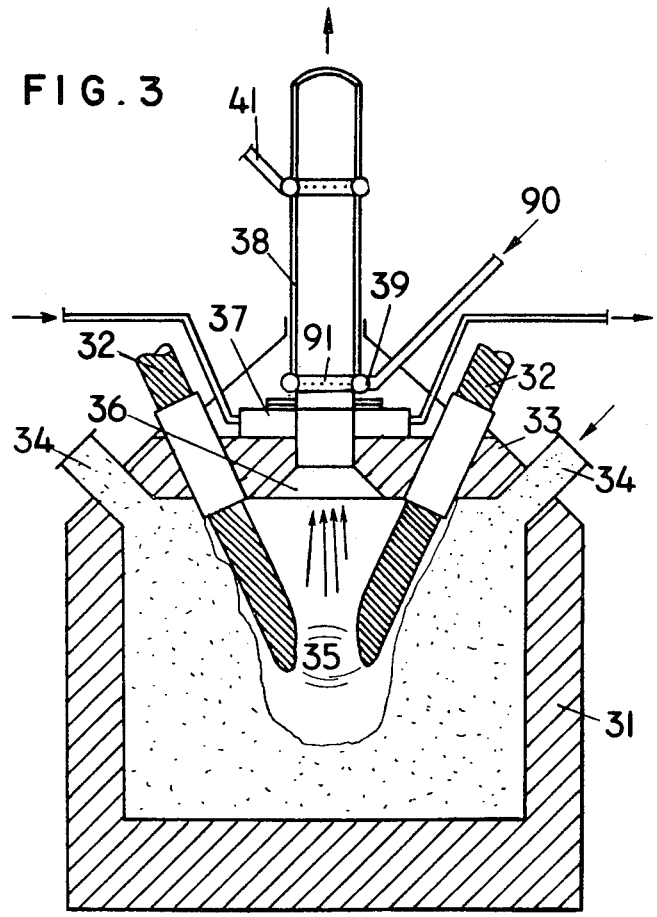
FIG. 3 is a detail view, in cross-section and also in a general diagrammatic manner, of an electric furnace and the cooling chamber and mixing chamber associated therewith for use in the process of the invention.

A specific embodiment of an electric furnace and attached cooling and mixing chambers is illustrated in FIG. 3.

31 indicates a furnace lined with carbon-resistant refractory oxidic ceramics and provided with graphite electrodes 32 which pass through the top plate 33 of the furnace. A mixture of quartz-containing material and coke is introduced through inlet openings 34. Arc 35 which forms between the graphite electrodes 2 converts the feed into a gas mixture consisting of silicon monoxide and carbon monoxide. The gas leaves the furnace through the outlet 36.

A pipe 38 is disposed on top of a cooling chamber 37 through which cooling water passes. Steam is introduced into the lower part of the pipe by means of an inlet 90 and an annular duct 39 which is provided at its inner face with a series of apertures 91. The apertures may also be in the form of nozzles of special shape. The silicon monoxide is thus converted to the product having silane and silanol groups attached to the molecule.

The introduction of the steam can be effected at right angles to the hot gas current. However, it can also be carried out in a direction which is at a downwardly or upwardly directed angle relative thereto. The jets of steam can also be introduced at inlet angles which alternate in their direction. If desired, by tangentially directed feeding an extension of the residence time and a particularly thorough mixing in the reaction zone may be attained.

Additional steam as well as air may be introduced through an annular duct 41 for purposes of temperature adjustment and also for the pneumatic conveyance of the formed intermediate product. The same effects can also be obtained by injecting water or a combination of water and steam. Instead of introducing water through duct 41, it may be preferable under certain conditions to introduce steam and water simultaneously through duct 90 into the annular duct 39 or, alternatively, to inject water directly above the annular duct 39.

A silicon dioxide of particularly good thickening properties is obtained by diluting the silicon monoxide by addition of a gas prior to reacting it with the steam. Mixtures of gases may also be used for this purpose. The dilution gas is preferably introduced into the electric furnace at the place where the silicon monoxide is formed, that is in the area of the arc, for instance in the space indicated at 35 in FIG. 3. The introduction of the dilution gas can be effected by internal bores in the electrodes or by separate ducts, particularly ducts formed of graphite. The amount of dilution gas preferably is between about 1 and 4 times the volume of the silicon monoxide.

All types of gases can be used for this purpose which do not enter into undesirable reactions with the silicon monoxide. Of use in this connection have proven argon, nitrogen and hydrogen. Preferred is the use of the gas mixture obtained in the process itself and consisting of hydrogen and carbon monoxide, provided that the process is carried out only with steam. The minor amount of carbon dioxide contained in the gas has no noticeable effect on the quality of the final product. By virtue of the use of such dilution gases prior to the steam treatment, it is possible to obtain products having a viscosity higher by 10 to 15%.

The exact course of the reactions which take place during the steam treatment cannot be determined with 100% certainty. However, the following gives a tentative indication of the mechanics of the reaction.

As specimens obtained during the reaction show, what takes place in this case is not simply an oxidation of the gaseous silicon monoxide to silicon dioxide in accordance with the equation $$SiO(g) + H_2O(g) \rightarrow SiO_2(f) + H_2 \qquad (3)$$

Rather, predominantly, an attachment of water takes place as follows:

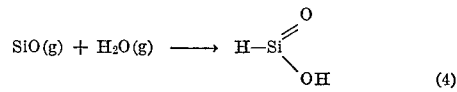

(4)

upon formation of silane and silanol groups. The silane and silanol groups can be found by ultra-red spectroscopy in the intermediate product. In addition to the Si—H bonds there are also found $SiH_2$ groups in the ultra-red spectrum which may have been formed by the reaction $$SiO(g) + H_2 \rightarrow H_2SiO \qquad (5)$$

The hydrogen required for this reaction may originate from the well known water-gas equilibrium $$CO + H_2O \rightleftharpoons H_2 + CO_2 \qquad (6)$$

or it may be derived from the reaction above listed as (3) which also takes place to a certain extent.

If the intermediate product is intercepted prior to entering the after-treatment apparatus (8 in FIGS. 1 and 2), the formed silane groups can be detected, apart from the appearance in the ultra-red spectrum, by adding a silver nitrate solution to a suspension in water. The silver which is precipitated by the reduction immediately causes the suspension to adopt a dark-brown to black color. With water the intermediate product generates hydrogen at room temperature which limits its use as filler.

The thermic aftertreatment of the intermediate product under the conditions of the invention by means of air or steam removes the silane groups and also part of the silanol groups and thus imparts the desired strongly thickening properties. The highly sensitive silver nitrate test shows, for instance, after treatment with air at 600° C. for 3 minutes, the presence of only very minor traces of silane groups.

A number of measuring methods are used in industry to determine the thickening and thixotropic action. These methods provide for the measurement of the viscosity of dispersions of the thickening agent, in a usually organic, dispersing agent if specific amounts of shearing force are applied. Because of the strong interaction of viscosity and temperature, a perfect adjustment of the measuring arrangement by thermostats is necessary. Also, the viscosity of dispersions of solids is strongly dependent on the pretreatment of the dispersion prior to the viscosity measurement.

To assay the products of the invention, the measuring instruments employed were the so-called "Haake-Viskowaage" and the "Epprecht-Rheometer." The measuring temperature was 22° C. The pretreatment was effected with a homogenizer and a three-roll mill. The measurements were carried out in 6% dispersions.

Table 1 shows the viscosities of various silicic acids obtained with the Viskowaage and the Rheometer. For comparison purposes, a number of commercially available wet-precipitated silicic acids were used together with a number of commercially available silicic acids produced by high-temperature hydrolysis of $SiCl_4$ and a commercially available silicic acid which had been formed by oxidation of silicon monoxide. These silicic acids were compared with a number of silicic acids made by the process of the invention. The dispersing agents were butanediol-1,4 and an unsaturated polyester lacquer.

The following table shows the results obtained

TABLE 1

|  | Butanediol-1,4 | | Polyester lacquer, |
| --- | --- | --- | --- |
|  | Viskowaage, cp. | Rheometer, cp. | rheometer, cp. |
| Wet-precipitated silicic acid | 140 | ~10 |  |
| Silicic acid from $SiCl_4$ | 200–350 | 800–1,000 | 1,200–1,800 |
| Silicic acid from SiO | 140–170 | ~15 | 300–450 |
| Silicic acid according to the process of the invention | 220–340 | 810–1,525 | 1,200–1,700 |

Silicic acids with viscosity values below 200 cp. are not useful for purposes where a thickening action is desired. This can be shown by the fact that this type of dispersion will readily drain after immersion from a glass rod. At viscosity values above 250 cp., draining no longer takes place.

Table 1 shows that wet-precipitated silicic acid has no industrially useful thickening effect, and the same table furthermore shows that the silicic acid formed in conventional manner by oxidation of SiO is only slightly different from the wet-precipitated silicic acid. The viscosity of the silicic acid obtained by flame hydrolysis from $SiCl_4$ is on a distinctly higher level and permits a broad use in areas where a marked thickening action is necessary.

The figures found in Table 1 show that by the process of the invention it is possible to impart highly thickening properties to a silicon dioxide formed of silicon monoxide and that thus this type of silicon dioxide can be used successfully in areas which so far have been reserved to silicic acid obtained by flame hydrolysis. A comparison of the two bottom lines of Table 1 shows the great superiority of the silicon dioxide of the invention as against silicon dioxide made in the prior-art manner from silicon monoxide.

The following examples will further illustrate the invention.

Example 1

A mixture of 5.45 kg. quartz sand per hour and 1.09 kg. coke per hour was continuously fed into an electric arc furnace and converted therein into the gas phase. The gas left the furnace at a temperature between about 1500 and 2500° C. This gas stream contained silicon monoxide and carbon monoxide. Steam was blown into the gas current through an annular duct arranged concentrically around the gas current and provided with forty apertures. The steam was at a temperature between 120 and 130° C. and was fed in an amount of 60 kg./h. From an annular duct thereabove an amount of air of 250 Nm.³ was introduced to reduce the temperature of the gas current to between 350 and 400° C. The gas was then passed into a separator centrifuge where the highly dispersed intermediate product was removed. This product was then treated in a fluidizing bed which had been heated to 520° C. at an average residence time of 10 minutes. The fluidizing medium was 6 Nm.³ air/h. The product leaving the fluidizing bed had a white color, a specific surface of 219 m.²/g., measured by means of $N_2$ adsorption, according to the BET method and a bulk density of 15 g./l. The pH value of an aqueous 4% suspension thereof was 6.3.

The viscosity in butanediol amounted to 310 cp. measured with the Viskowaage and 1480 cp. measured with the Rheometer. In unsaturated polyester lacquer, the Rheometer showed a viscosity of 1710 cp.

Electron microscope photographs showed spherical, compact particles of a diameter between about 5 and about 150 millimicrons.

Example 2

A mixture of ground quartzite and crushed silicon in a weight ratio of 2.1:1 was continuously fed into an electric arc furnace. There was thus formed a gas current containing about 3.8 kg. silicon monoxide per hour. In the mixing chamber as used in Example 1, the hot gas current was mixed with 80 kg. steam per hour and an amount of steam of 140 kg./h. was also introduced from the upper annular duct. The intermediate product formed by reaction between the silicon monoxide and steam, which product contained silane and silanol groups, was separated by a separator from the gas current, resulting in an amount of 5 kg./h. of product. The product was then passed through a revolving tube oven heated to 500° C. The average residence time was 10 minutes. An air current caused by thermal convection formed on top of the material in the furnace.

The white silicon dioxide removed from the revolving furnace had a surface of 134 m.²/g. and in butanediol showed a viscosity of 285 cp., measured with the Viskowaage, and 1130 cp., measured with the Rheometer. In unsaturated polyester lacquer the viscosity was 1420 cp. The bulk weight was 30 g./l.

Example 3

The process in this example was as schematically indicated in FIG. 2. A mixture of 5.5 kg. of ground quartz per hour and 1.1 kg. petrol coke per hour was continuously fed into an electric arc furnace and converted to the gas phase and then reacted above the furnace with 54.7 kg. stream per hour. 150 kg. of a circulating gas was then added to the reaction mixture per hour to effect cooling and keep the gas moving. The circulating gas consisted of 94.2 wt. percent $H_2O$, 3.2 wt. percent CO, 2.2 wt. percent $CO_2$ and 0.4 wt. percent $H_2$. The intermediate product which was removed in a separator was then treated in a fluidizing bed at 660° C. with an average residence time of 1.5 minutes. The fluidizing medium was 0.5 kg. steam/h. There were obtained 5.4 kg. silicon dioxide with a specific surface of 181 m.$^2$/g. and a viscosity, measured in butanediol on a Rheometer, of 1525 cp. The bulk weight of the product was 21 g./l.; the pH of a 4% aqueous suspension was 6.1.

150 kg./h. of the gas current remaining after removal of the solids were recirculated by means of a suction fan and 56.2 kg./h. were condensed after compression to 3.2 atm. above atmospheric in a subsequent heat exchanger. Following the passing through the heat exchanger, 53 kg. of water/h. were withdrawn and a gas mixture of 1.8 kg. CO/h., 0.24 kg. $H_2$/h. and 1.2 kg. $CO_2$/h. was thus obtained. The heat of condensation obtained in the heat exchanger was employed to evaporate 54.7 kg. water/h., which latter, as previously indicated, was reacted with the silicon monoxide-containing gas current in the electric arc.

Example 4

The process of this example was the same as in Example 1. However, instead of stream there was blown into the mixture from the same annular duct air in an amount of 30 Nm.$^3$. The silicon dioxide thus produced was treated in a fluidizing bed at 500–530° C. with a mean residence time of 2–4 minutes. Both air and steam were used as the fluidizing medium.

The product removed from the fluidizing bed had a specific surface of 188 m.$^2$/g., a pour weight of 32 g./l. and a viscosity of 158 cp. measured with the Viskowaage in a 6% dispersion in butanediol-1,4. The viscosity measured with the Rheometer was 15 cp.

The measured viscosities were entirely unsatisfactory for use as thickening agents. When the amount of steam and the entire process were arranged so that the reaction of the silicon monoxide resulted in complete oxidation to $SiO_2$, that is if no silane group-containing intermediate product was formed, no better results were obtained for the thickening action of the $SiO_2$ as with the oxidation by air. This is further shown in the following example.

Example 5

19 kg. hydrogen/h. were blown into a lower silicon oxides-containing gas current produced as in Example 1. The hydrogen was introduced through an annular duct having forty apertures. A white, completely oxidized silicon dioxide was obtained which, in a 6% dispersion in butanediol-1,4 measured with the Viskowaage, had a viscosity of 188 cp. This viscosity by an aftertreatment as in Example 4 increased to 191 cp. The viscosity measured with a Rheometer was 234 cp.

Example 6

In this example a circulating process was used as illustrated in FIG. 2. A mixture of 5.5 kg. quartz sand/h. and 1.1 kg. of crushed coke/h. was continuously introduced into an electric arc phase and was converted there to the gas phase and reacted directly above the furnace with 50 kg. steam/h. About 80 kg. of a circulating gas/h. was added to the reaction mixture to cool the mixture and to improve the circulation. The intermediate product removed in the separator 6 through valve 7 was subjected to an aftertreatment in a revolving tube furnace with air at 500° C. The residence time was 15 minutes.

The obtained final product had a specific surface of 173 m.$^2$/g., a pour weight of 25.5 g./l. and a pH value in a 4% aqueous suspension of 6.8. The product was subjected to stirring with a paddle stirrer (5.2 cm., diameter, 1500 r.p.m.) in a 6% suspension in butanediol at a temperature of 22° C. for 10 minutes. 2 hours after making of the dispersion the same was measured in a Haake-Rotovisko at 22° C. and with a shear force of 2.7 sec.$^{-1}$. The viscosity was 1780 cp. The measurement of a similarly treated commercially available silicic acid obtained by flame hydrolysis of $SiCl_4$ showed a value of 306 cp. In a 4% dispersion the values were 495 cp. for the product of the invention and 145 cp. for the silicic acid obtained from $SiCl_4$.

Example 7

An hourly mixture of 5.5 kg. quartz split and 1.1 kg. crushed petrol coke was continuously fed into an electric arc furnace, where a gas mixture was formed consisting of 4.1 kg. silicon monoxide/h. and 2.5 kg. carbon monoxide/h. which mixture was reacted directly above the furnace with 50 kg. steam/h. The reaction mixture was cooled right above the reaction zone with an amount of air between 200 and 240 Nm.$^3$ and the intermediate product which was separated in a cyclone was then treated in a fluidizing apparatus at 680° C. with air at an average residence time of 1 minute. The final products withdrawn at different points of time showed viscosity values in butanediol between 235 and 250 cp. measured with the Viskowaage.

While all other conditions were the same an amount of argon of 4 Nm.$^3$/h. was introduced through the graphite electrodes by way of an internal bore connected to the source of the gas. The burning of the arc did not deteriorate as a result of this modification. The formed argon plasma was even slightly improved. The products removed in the fluidizing bed showed viscosity values between 270 and 295 cp. (butanediol, Viskowaage).

Example 8

The same process was used as in Example 7, but instead of argon an amount of 6 Nm.$^3$/h. nitrogen was introduced. The results were the same. Only the electric arc was somewhat less steady.

Example 9

The process was the same as in Example 7 but instead of air in an amount of 200–240 Nm.$^3$/h. steam was used in an amount of 160 kg./h. 5.5 Nm.$^3$ hydrogen/h. was introduced into the arc space through 4 graphite inlet tubes. The products obtained from the aftertreatment in the fluidizing bed had viscosity values between 310 and 350 cp. (butanediol, Viskowaage).

Example 10

The same method was used as in Example 3. However, 2.5 Nm.$^3$/h. of the residual gas consisting of hydrogen, carbon monoxide and carbon dioxide was introduced through four graphite inlet tubes (see FIG. 2, duct 24). The residual gas had a composition comprising about 55 vol. percent $H_2$, about 35 vol. percent CO and about 8 vol. percent $CO_2$. Silicon dioxide removed from the fluidizing bed had a specific surface of 109 m.$^2$/g., a bulk weight of 31 g./l. and viscosity values between 250 and 260 cp. measured in butanediol with the Viskowaage.

Without further analysis, the foregoing will so fully reveal the gist of the present invention that others can apply current knowledge readily adapt it for various applications without omitting features that, from the standpoint of prior art, fairly constitute essential characteristics of the generic or specific aspects of this invention and, therefore, such adaptions should and are intended to be comprehended within the meaning and range of equivalence of the following claims.

What is claimed as new and desired to be protected by Letters Patent is set forth in the appended claims.

1. The process of making a highly dispersed silicon dioxide having thickening properties, the said process comprising the steps of reacting silicon dioxide or a silicon-dioxide-containing material in a reducing zone at a temperature in excess of 1500° C. with a reducing agent; passing the silicon-monoxide-containing gas current thus formed from said reducing zone into an immediately adjoining oxidizing zone; and reacting the gas there while it is still at said temperature with steam whereby a finely dispersed silane and silanol groups-containing solid intermediate product is formed in said gas current; then chilling the gas; thereupon separating the major portion of the said solid product from the residual gas and finally subjecting the separated solid product to a thermal aftertreatment with steam or air at about 100 to 1000° C. for a time between about 0.5 and 10 minutes to destroy the said silane groups and thus to impart strongly thickening and thixotropy inducing properties to the product.

2. The process of claim 1, wherein the reaction between the silicon-monoxide-containing gas and the steam is effected at a temperature between about 1500 and 2500° C.

3. The process of claim 1, wherein quartz sand is reacted with carbon in the initial reaction and wherein the hot gas current formed thereby contains carbon monoxide in addition to said silicon monoxide.

4. A highly dispersed white silicon dioxide made by the process of claim 1, having strong thickening and thixotropy-causing properties, the said silicon dioxide consisting of spherical, compact primary particles having a diameter between 5 and 150 millimicrons, a specific surface between 50 and 300 m.$^2$/g., a bulk weight between 15 and 30 g./l. and a viscosity as measured at 22° C. in a 6% dispersion in 1,4-butanediol being at least 200 cp., and the said silicon dioxide exhibiting a neutral reaction when dispersed in water at a 5% concentration.

5. The process of claim 1, wherein the thermal aftertreatment is effected at a temperature between 200 and 700° C.

6. The process of claim 1, wherein the thermal aftertreatment is effected in a fluidizing bed.

7. The process of claim 1, wherein the chilling is effected in the presence of an oxidizing gas.

8. The process of claim 1, wherein the gas current containing said silicon monoxide is diluted with a diluting gas or gas mixture prior to being subjected to the action of the steam.

9. The process of claim 8, wherein the diluting gas is a noble gas, nitrogen or hydrogen.

10. The process of claim 8, wherein the diluting gas is a mixture of hydrogen and carbon monoxide obtained in the course of the process after separation of said solid intermediate product from the gas current or arising in said thermal aftertreatment or in both of these steps.

11. The process of claim 8, wherein the amount of diluting gas is 1 to 4 times the volume of silicon monoxide formed in the initial reaction.

12. The process of claim 3, wherein the reaction of the quartz sand and carbon is effected in an electric arc furnace.

13. The process of claim 3 wherein the reaction between quartz sand and carbon is effected in an electric arc furnace and a diluting gas is introduced into the silicon monoxide and carbon monoxide-containing gas current while the latter is being formed in said electric arc.

References Cited

UNITED STATES PATENTS

| 2,535,659 | 2/1950 | Wolff | 23—182 V |
| 2,573,057 | 10/1951 | Porter | 23—182 V |
| 2,823,979 | 2/1958 | Sears | 23—182 V |
| 3,148,026 | 9/1964 | Roderburg | 23—182 V |
| 3,053,627 | 9/1962 | Flemmert | 23—182 V |
| 3,043,660 | 7/1962 | Hughes | 23—182 V |
| 2,865,778 | 12/1958 | Strassburg | 23—182 V X |

EDWARD STERN, Primary Examiner

U.S. Cl. X.R.

106—288 B; 23—1 F, 182 R, 262